United States Patent
Streuer et al.

(10) Patent No.: US 9,673,441 B2
(45) Date of Patent: Jun. 6, 2017

(54) CONNECTION POLE FOR AN ACCUMULATOR, POLE SHAFT OF AN ACCUMULATOR, AND ACCUMULATOR

(71) Applicant: Johnson Controls Autobatterie GmbH & Co. KGaA, Hannover (DE)

(72) Inventors: Peter Streuer, Hannover (DE); Anne-Laure Ledoux, Langenhagen (DE)

(73) Assignee: JOHNSON CONTROLS AUTOBATTERIE GMBH & CO. KGAA, Hannover (DE)

( * ) Notice: Subject to any disclaimer, the term of this patent is extended or adjusted under 35 U.S.C. 154(b) by 0 days.

(21) Appl. No.: 14/646,849

(22) PCT Filed: Nov. 25, 2013

(86) PCT No.: PCT/EP2013/074619
§ 371 (c)(1),
(2) Date: May 22, 2015

(87) PCT Pub. No.: WO2014/080012
PCT Pub. Date: May 30, 2014

(65) Prior Publication Data
US 2015/0303437 A1 Oct. 22, 2015

(30) Foreign Application Priority Data
Nov. 26, 2012 (DE) .......... 10 2012 111 409

(51) Int. Cl.
*H01M 2/30* (2006.01)
*H01M 2/06* (2006.01)
(Continued)

(52) U.S. Cl.
CPC ............... *H01M 2/30* (2013.01); *H01M 2/06* (2013.01); *H01M 2/307* (2013.01);
(Continued)

(58) Field of Classification Search
CPC .......... H01M 2/06; H01M 2/30; H01M 2/307; H01M 2/28; H01M 2220/20; H01R 4/5016
(Continued)

(56) References Cited

U.S. PATENT DOCUMENTS 2,678,960 A 5/1954 Jensen
6,030,723 A 2/2000 Nagano et al.
(Continued)

FOREIGN PATENT DOCUMENTS

EP 2416408 2/2012

OTHER PUBLICATIONS

International Search Report & Written Opinion for International Application No. PCT/EP2013/074619 mailed Feb. 13, 2014.
(Continued)

*Primary Examiner* — Gregg Cantelmo
(74) *Attorney, Agent, or Firm* — Fletcher Yoder, P.C.

(57) ABSTRACT

A connection pole for an accumulator, wherein the connection pole includes an inner hollow region configured to receive a pole shaft of the accumulator. The connection pole includes ribs on its inner wall in the inner hollow region, wherein the ribs run in the longitudinal direction of the connection pole and one or more or all of the ribs are integrally formed with the connection pole from the material of the connection pole and protrude from the inner side of the connection pole such that the ribs form a gap between the pole shaft and the inner surface of the connection pole.

14 Claims, 3 Drawing Sheets

Figure 1:
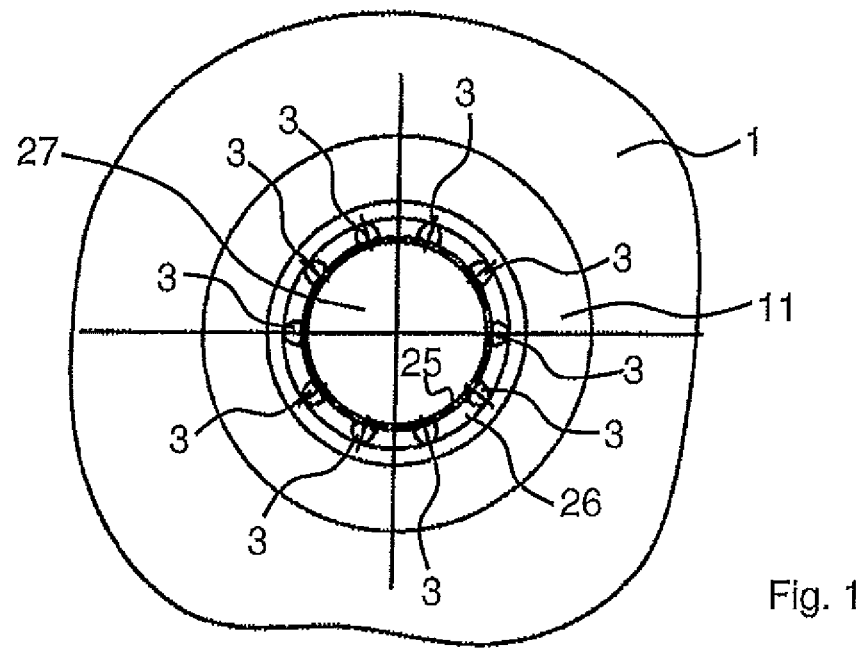

(51) Int. Cl.
*H01M 2/28* (2006.01)
*H01R 4/50* (2006.01)

(52) U.S. Cl.
CPC ............. *H01R 4/5016* (2013.01); *H01M 2/28* (2013.01); *H01M 2220/20* (2013.01)

(58) Field of Classification Search
USPC .................................................. 429/175, 176
See application file for complete search history.

(56) References Cited

U.S. PATENT DOCUMENTS

| | | | |
|---|---|---|---|
| 6,232,016 B1 * | 5/2001 | Fink ..................... | H01M 2/305 |
| | | | 429/178 |
| 7,517,610 B2 | 4/2009 | Popp | |
| 8,608,005 B2 | 12/2013 | Streuer et al. | |
| 9,048,476 B2 * | 6/2015 | Streuer ............... | H01M 2/0482 |
| 2010/0291435 A1 | 11/2010 | Garin et al. | |
| 2011/0250493 A1 | 10/2011 | Balzan et al. | |

OTHER PUBLICATIONS

EP 13796045.6 Office Action dated May 9, 2016.
CN 201380061063.1 Office Action dated Aug. 16, 2016.

* cited by examiner

CONNECTION POLE FOR AN ACCUMULATOR, POLE SHAFT OF AN ACCUMULATOR, AND ACCUMULATOR

The invention relates to a connection pole for an accumulator in accordance with claim 1. The invention furthermore relates to a pole shaft of an accumulator in accordance with claim 8 and an accumulator in accordance with claim 11.

In general, the invention relates to the field of rechargeable electrochemical accumulators, particularly accumulators for motor vehicles. Connection poles for accumulators serve in establishing contact between the accumulator and electrical devices which the accumulator is to supply with power. When the accumulator is designed for example as a starter battery for a motor vehicle, the corresponding pole terminals are connected to two connection poles of the starter battery.

Such a connection pole has an inner hollow region designed for the insertion or feeding in of an accumulator pole shaft. The pole shaft can be connected for example to the electrode plates of a plate group inside the accumulator. When an accumulator is manufactured, the plate group with associated pole shafts is first inserted into a section of the housing. A cover section provided with connection poles is thereafter placed atop the housing section of the accumulator. The respective pole shafts are then inserted or fed into the inner hollow region of the connection pole. At this point, increased friction and jamming may occur when the pole shafts are being inserted into the inner hollow region of the connection pole, particularly if the pole shafts are at a slight angle or not exactly aligned with the connection poles. This complicates the manufacturing of the accumulator.

There are known connection poles of this genre, for example from DE 10 2010 022 584 A1. To reduce the friction between the connection pole and the pole shaft, EP 1 453 124 B1 discloses providing a sliding element completely surrounding the pole shaft circumferentially. DE 10 2010 033 645 A1 proposes arranging a plurality of strip-shaped sliding elements, which can be made from the plastic material of the cover section, at a spacing from one another over the inner circumference of the inside of a conventionally manufactured connection pole.

The present invention is based on the task of specifying a connection pole for an accumulator which enables improving the manufacturing of the accumulator, particularly when seating the cover section onto the housing section, as an economical and technically feasible alternative to the aforementioned solutions. A pole shaft enabling the manufacturing of the accumulator to be improved, particularly when seating the cover section onto the housing section, is also to be specified. An accumulator improved in terms of its manufacturing, which enables improved seating of the cover section onto the housing section, is furthermore to be specified.

This task is solved in accordance with claim 1 by a connection pole for an accumulator, wherein the connection pole has an inner hollow region which is designed for the insertion or feeding in of an accumulator pole shaft, wherein the connection pole has a plurality of ribs on its inner wall in the inner hollow region which run in the longitudinal direction of the connection pole, whereby one or more or all of the ribs are integrally formed with the connection pole from the material of said connection pole.

According to the invention, the connection pole thus comprises a plurality of ribs on its inner wall in the inner hollow region which run in the longitudinal direction of the connection pole with all or some being formed integrally with the connection pole from the material of said connection pole. If the connection pole is made of lead, the ribs can be configured as e.g. sliding lead ribs. A readily technically feasible and economical alternative to the aforementioned prior art solutions is thus hereby specified. The connection pole can be produced with the ribs right during its manufacture so that it is already complete with its integrated ribs when the connection pole is overmolded by the material of the cover section and does not require any subsequent processing. A cover section produced in this manner can then be easily placed atop the lower housing section of the accumulator with the pole shafts protruding therefrom without there being any twisting or jamming. The pole shafts can instead easily slide along the ribs and then be inserted in centered manner into the inner hollow region of the connection pole, respectively also be fed in completely as the case may be.

The connection pole can have an inner hollow region configured to be wholly continuous in the longitudinal direction of the connection pole or only partially continuous. In the case of a wholly continuous inner hollow region, the connection pole is designed like a sleeve, e.g. in the form of a connector ferrule.

The ribs formed on the inner wall of the connection pole are at least circumferentially spaced apart from one another so as to form interstices. This enables the pole shaft to easily slide into the inner hollow region of the connection pole at low friction. A further advantage is that due to the free space between the ribs, there is still sufficient room for the corrosive products which form in practice, particularly in hot countries. They do not interfere with the further operation of the accumulator as they can deposit in the free spaces.

With respect to its form, the connection pole can be designed as per e.g. DE 10 2010 022 584 A1. In particular, the connection pole can comprise a longitudinal connecting section adapted for the attachment of a pole terminal. The pole terminal is then fixed to the exterior of the connection pole in the connecting section.

The connection pole can further comprise an attachment section adapted for the attachment of the connection pole in a housing section of the accumulator, e.g. in the cover section. The connection pole can for example be integrated into the material of the accumulator's housing section by the attachment section, e.g. in an injection-molding process during the manufacture of the housing section. According to one advantageous design, the attachment section exhibits a labyrinth, e.g. in the form of one or more circumferentially running projections arranged on and protruding from the outer wall of the connection pole which can be formed for example with undercuts.

The pole shaft as well as the connection pole are usually made of lead. The ribs contribute to considerably reducing the otherwise relatively high degree of friction which can occur upon two lead components coming into contact.

Instead of just one sliding element extending across the entire circumference of the pole shaft, the invention proposes a plurality of e.g. strip-shaped ribs spaced apart from one another over the inner circumference of the connection pole. This allows reducing the contact surface between the ribs and the pole shaft and thus a further reduction of disruptive friction. Additionally, strip-shaped spaced ribs can be manufactured more easily and more economically. The gaps provided between the ribs moreover creates free spaces between the ribs. This, too, can improve the production process when manufacturing an accumulator. The strip-shaped configuration to the ribs has the further advantage of further improving a potentially angled alignment of the pole shafts. The ribs hereby advantageously extend in the insertion direction of the pole shaft.

All told, the invention allows for largely minimizing disruptive friction and preventing jams in the pole shaft areas when the cover section is placed atop the housing section. In consequence, potentially unwanted depressing of the pole shafts upon the positioning of the cover section can be prevented.

The connection pole can in particular be manufactured by cold deformation. Manufacturing by means of a casting process is also possible. It is advantageous to thereby produce ribs which are free of defects and cavities. Also advantageous is producing ribs with the smoothest surface possible so as to provide a good sliding effect or sliding surface respectively.

The ribs are advantageously arranged so close together over the inner circumference of the connection pole and are of such a thickness that the upper end of the pole shaft cannot come into contact with the inner wall of the connection pole between two ribs. This thus ensures the pole shaft is in sliding alignment along the ribs and can be inserted into the upper section of the connection pole without obstruction. The connection pole and pole shaft can then be welded.

The advantageous embodiments of the invention described in the following can in principle be realized with all of the ribs or also with just a subset of the ribs, e.g. with one or more or all of the ribs. For the sake of simplicity, "ribs" will thus be used in the general sense. Doing so implies the feasibility of the cited embodiment being realized with just one, with a plurality or with all of the ribs.

In accordance with one advantageous embodiment of the invention, the connection pole has an attachment section which is adapted for the attachment of the connection pole in a housing section of the accumulator and one or more or all of the ribs are arranged on the inner wall of said attachment section. The attachment section correspondingly comprises at least one part of the inner hollow region of the connection pole.

One or more or all of the ribs can in particular be arranged on the inner wall of the attachment section at the lower end of the connection pole on the far side of the connecting section or close to said lower end. This has the advantage of the ribs being able to come into contact with the pole shaft relatively quickly and being able to guide same right from the start of the pole shaft being inserted into the inner hollow region.

According to one advantageous embodiment of the invention, the attachment section comprises a labyrinth section in which the outer circumference of the connection pole exhibits at least one circumferential projection, wherein the labyrinth section is designed to form a labyrinth with the housing material and one or more or all of the ribs are arranged on the inner wall of the labyrinth section.

According to one advantageous embodiment of the invention, the ribs extend substantially over the attachment section or at least substantially over the labyrinth section in the longitudinal direction of the connection pole. Doing so thereby realizes a long guideway for the pole shaft, ensuring easy and reliable inserting of the pole shaft into the connection pole.

According to one advantageous embodiment of the invention, the ribs run in the longitudinal direction of the connection pole at least to one end of the connection pole directed toward the interior of the accumulator; i.e. up to the end pointing away from the connecting section of the connection pole provided for the connection of a pole terminal. This ensures a reliable, low friction guiding and aligning of the pole shaft right from the start of the process of positioning the cover section on the housing section of the accumulator.

According to one advantageous embodiment of the invention, the ribs protrude from the inner side of the connection pole such that a gap is formed between the inner side of the connection pole and a pole shaft in the area of the ribs. The ribs hereby advantageously function as spacers so that no direct contact, and thus unwanted friction, can occur between the pole shaft and the connection pole.

Thus, at no point does the pole shaft directly touch the inner side of the connection pole but is instead kept away and centered on all sides by the ribs.

The ribs can protrude from the entire inner surface of the connection pole; i.e. they can be at the farthest part of the connection pole extending into the inner area of the connection pole. The ribs can in contrast also be the farthest most protruding elements in only partial sections in the longitudinal direction of the connection pole. Thus, the ribs can protrude e.g. relative to the interior surface of the entire lower half of the connection pole with regard to the normal mounted position of the connection pole in a battery housing.

According to one advantageous embodiment of the invention, the ribs only extend upward toward a connecting section of the connection pole designed for the connection of a pole terminal but without reaching the connecting section; i.e. they terminate below the connecting section. According to one advantageous embodiment of the invention, the ribs extend toward the connecting section up to an anti-twist region of the connection pole; i.e. they terminate below said anti-twist region. This has the advantage of the ribs being centered in the connection pole within the insertion area of the pole shaft and not protruding too unnecessarily far upward.

According to one advantageous embodiment of the invention, one or more or all of the ribs are arranged in an inner wall section of the connection pole at which the inner wall of the pole shaft is tapered. Hence, the inner hollow region of the connection pole at the lower end of said connection pole at the far side of the connecting section can be for example of approximate funnel configuration. The contour of the inner wall can be of e.g. linear or curved tapering design. This arrangement of the ribs has the advantage of the connection pole being able to be easily removed from its mold during manufacturing.

According to one advantageous embodiment of the invention, the connection pole has a greater inner wall inclination relative to the longitudinal axis of the connection pole in the area of the ribs than in a connecting section protruding from the cover section designed for the connection of a pole terminal to the connection pole. The interior of the connection pole can thereby be funnel-shaped in the area of the ribs. Such a funnel-shaped configuration has the advantage of further simplifying and more reliably realizing the insertion of the pole shaft into the connection pole.

The inclination of the inner wall in the area of the ribs can be constant or can be variable in the longitudinal direction. Thus, the funnel-shaped configuration can for example have a linear profile (cone form) in the longitudinal direction or can be curved, particularly single-wall hyperboloidal. Particularly advantageous is an arcuate increase to the inner circumference progressing away from the connecting section in the area of the ribs.

According to one advantageous embodiment of the invention, one or more or all of the ribs are designed as friction-reducing ribs between the connection pole and the pole shaft. So doing further simplifies the manufacturing of such accumulators having such connection poles.

According to one advantageous embodiment of the invention, one or more or all of the ribs have their largest dimension in the longitudinal direction of the connection pole. The longitudinal direction of the connection pole usually corresponds substantially to the insertion direction of the pole shaft into the inner hollow region of the connection pole or, in the case of a connection pole of rotationally symmetrical design, in particular the axis of symmetry of the connection pole respectively. This noted embodiment has the advantage of there being a relatively long guideway when the pole shaft is inserted into the connection pole, which has the advantage of further improving reliable, low-friction insertion of the pole shaft into the connection pole.

According to one advantageous embodiment of the invention, one or more or all of the ribs are evenly distributed over the inner circumference of the connection pole. This enables uniformly reduced friction between the connection pole and the pole shaft circumferentially, regardless of where the pole shaft first makes contact with the connection pole.

According to one advantageous embodiment of the invention, one or more or all of the ribs are rounded on their side facing the interior of the accumulator. Doing so eliminates sharp corners. Any corners there may be can be rounded off. This facilitates the simple and quick insertion of the pole shaft into the connection pole.

According to one advantageous embodiment of the invention, the ribs taper in a direction pointing away from the interior of the accumulator; i.e. toward the connecting section for the pole terminal. The ribs can hereby taper for example conically or in curved fashion to their end. This has the advantage of realizing a smooth transition to an inner section of the connection pole in which the pole shaft can be welded to the connection pole. This can in particular prevent sharp-edged transitions from one inner section of the connection pole to the next, which has the advantage of the pole shaft being able to be inserted completely into the connection pole evenly and without any danger of twisting or jamming. According to one advantageous embodiment of the invention, the ribs taper in a direction toward the interior of the accumulator; i.e. away from the connecting section. The ribs can hereby be configured as described above for the opposite direction.

The cited task is additionally solved according to claim 8 by an accumulator pole shaft adapted for insertion or feeding into a connection pole of the accumulator, wherein the leading end of the pole shaft when inserted or fed into the connection pole is of rounded configuration in the pole shaft's longitudinal direction. This can also simplify the manufacture of such accumulators. The rounded end prevents the pole shaft from tilting or jamming at the connection pole. This hereby also allows slightly angled pole shafts to be readily inserted into connection poles. The rounding additionally prevents the pole shaft from scraping the inner side of the connection pole and/or the ribs provided there. Said pole shaft can in particular be used in combination with the above-described connection pole with the ribs provided on the interior, although it can also be advantageously used with conventional prior art connection poles.

The task cited at the outset is additionally solved according to claim 11 by an accumulator having at least one housing section, at least one group of electrode plates inserted into the housing section, at least one pole shaft connected to the group of electrode plates and at least one housing section designed as a cover section in which at least one connection pole is integrated, whereby the pole shaft is led into or through an inner hollow region of the connection pole, wherein a) the connection pole is designed in accordance with one of claims 1 to 9, and/or b) the pole shaft is designed in accordance with claim 10.

Such an accumulator can be manufactured without the manufacturing problems specified above and can thus be manufactured faster and more economically.

According to one advantageous embodiment of the invention, the connection pole is embedded in a plastic material of the cover section, e.g. insert-molded with the plastic material, whereby the plastic material at least also partially covers the lower edge of the connection pole. This has the advantage of the connection pole being particularly securely and stably fixed in the cover section and the plastic material overlapping the underside of the connection pole achieving a further improved sealing effect. The underside of the connection pole thereby refers to the lower face side of the connection pole facing the interior of the accumulator.

The following will reference drawings based on embodiments in describing the invention in greater detail.

Figure 2:
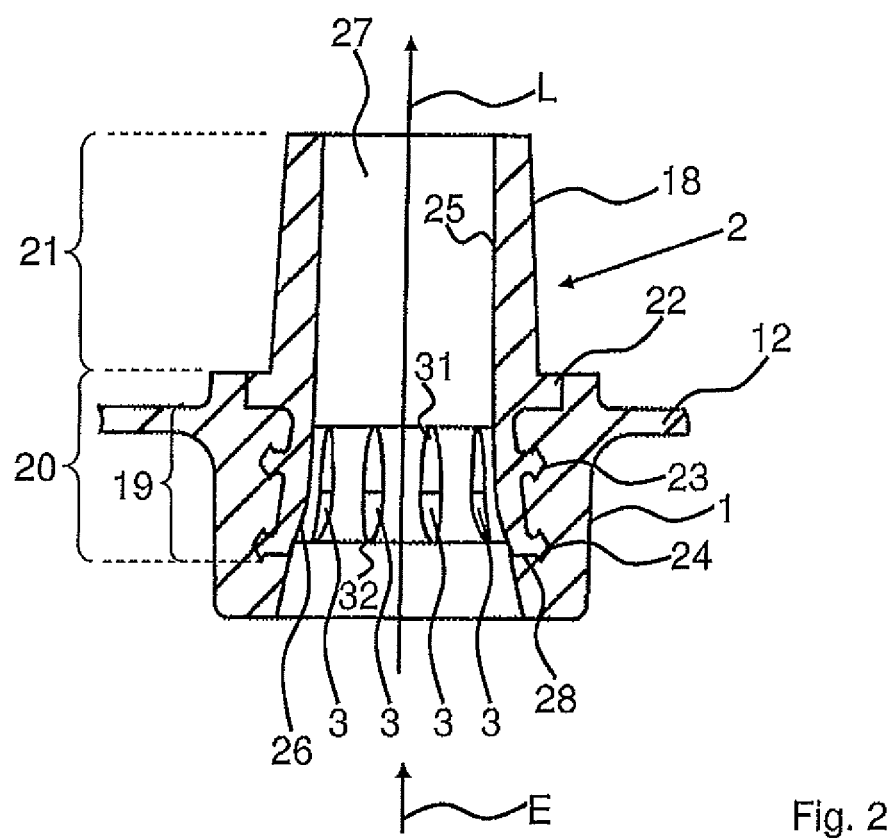
Figure 3:
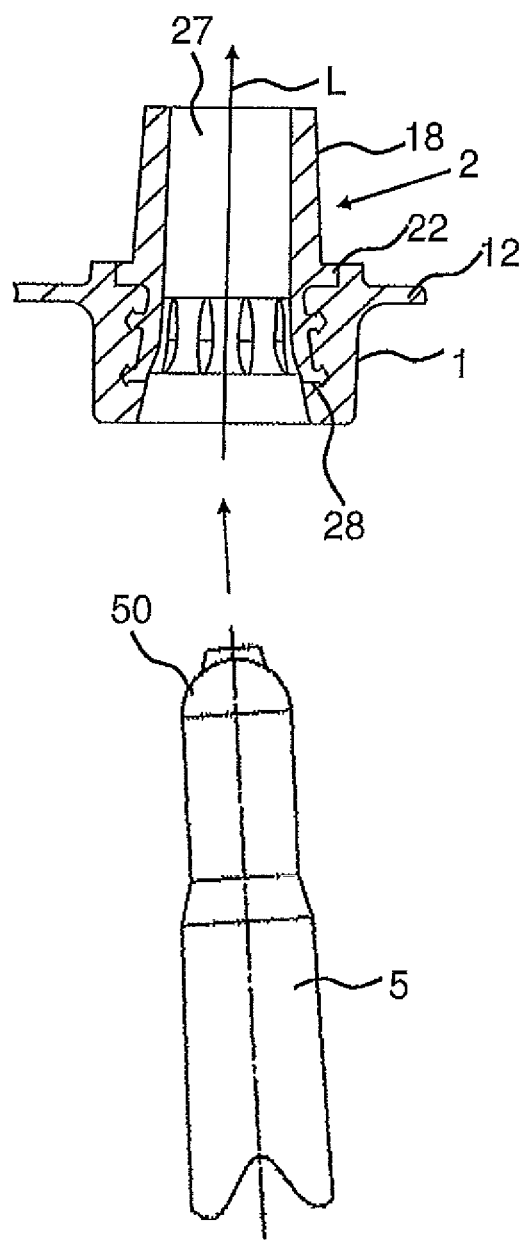
Figure 4:
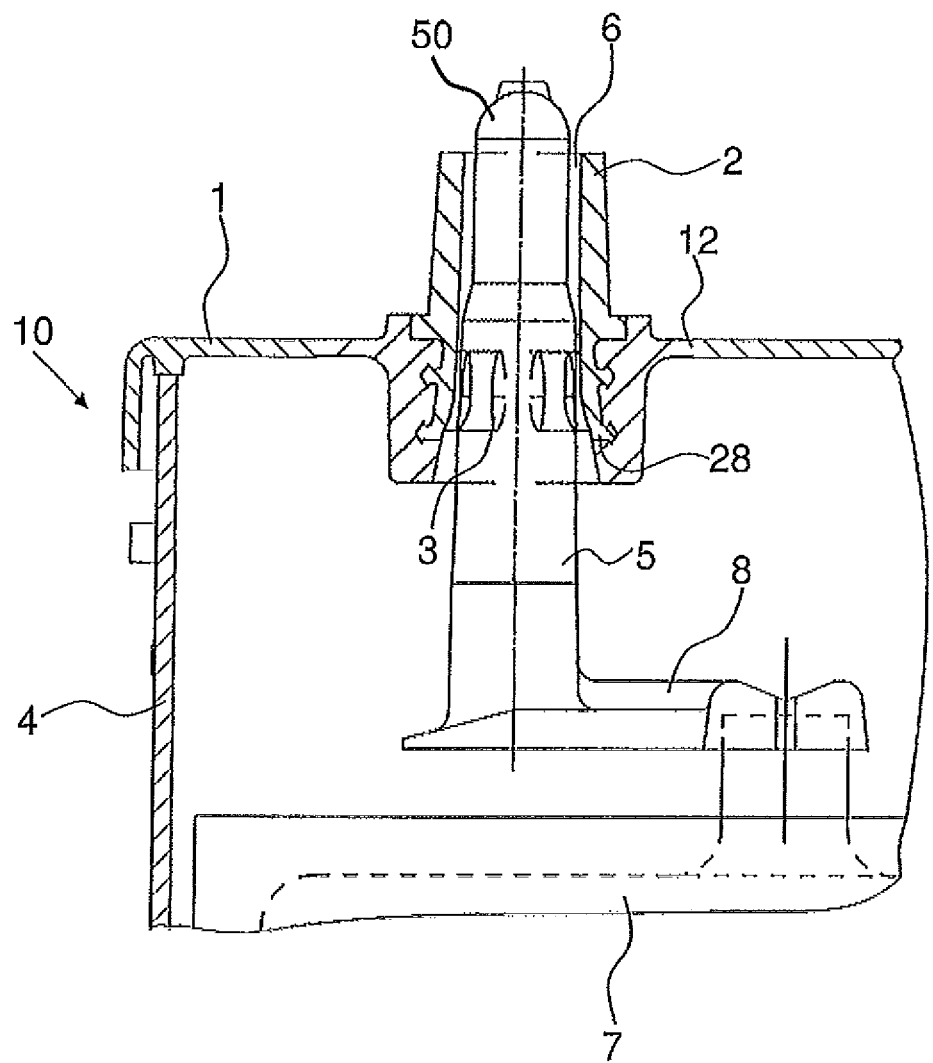

Shown are:

FIG. 1: an underside view of a connection pole embedded in a cover section of an accumulator;

FIG. 2: the connection pole with the cover section according to FIG. 1 in lateral cross section;

FIG. 3: a pole shaft being inserted into the arrangement according to FIG. 2; and FIG. 4: a detail of an accumulator.

The figures use the same reference numerals for elements which correspond to one another.

FIGS. 1 and 2 show parts of a cover section 1 with a connection pole 2 embedded in the plastic material of the cover section 1 from different views. FIG. 2 shows a lateral cross section in which the interior of the accumulator to be formed with the cover section is situated underneath a wall 12 of the cover section. The insertion direction of a pole shaft into the connection pole 2 is depicted by arrow E.

FIG. 1 shows an underside view of the cover section 1 with the connection pole 2 of FIG. 1; i.e. from the E direction.

The cover section 1 with the connection pole 2 will be described below on the basis of FIGS. 1 and 2.

The connection pole 2 comprises a connecting section 21 at and protruding from the upper side of the cover section 1. The exterior 18 of the connection pole 2 in connecting section 21 is designed for the connection of a pole terminal. The connection pole 2 gives way from the connecting section 21 to an attachment section 20, in which an annular circumferential enlargement 22 is initially formed, which can for example be of zigzag configuration at the outer circumference, in order to realize twist-locking of the connection pole 2 relative to the cover section 1. A labyrinth section 19 is formed under the annular circumferential enlargement 22 in which circumferential protrusions in the form of annular projections 23, 24 with hooked profiles are provided. The annular projections 23, 24 can also alternatively have a trapezoidal or rounded profile without hooks. The labyrinth section 19 creates a reliable gas-tight/fluid-tight seal between the connection pole 2 and the cover section 1. The connection pole 2 is embedded into the plastic material of the cover section 1, e.g. insert-molded with the plastic material, whereby the plastic material at least also partially covers the lower edge 28 of the connection pole 2.

The connection pole 2 is of sleeve-like design. An inner hollow region 27 of the connection pole 2 exhibits an upper section 25 and a lower section 26. A plurality of strip-shaped ribs 3 spaced apart from one another and evenly distributed over the inner circumference of the connection pole 2 are arranged in the transition zone from the upper section 25 to the lower section 26. The ribs are thereby formed directly from the material of the connection pole 2, e.g. from lead material. As can also be seen, the ribs are tapered in their respective end regions 31, 32.

The inner hollow region 27 of the connection pole 2 can have cylindrical, conical or curving inner wall sections. For example, the upper section 25 can be configured to be almost cylindrical or respectively tapered at a slight angle to the longitudinal axis L of the connection pole 2. It is advantageous for the lower section 26 to be of conical or curving configuration at a larger angle to the longitudinal axis L. In particular, the lower section 26 is of funnel shape configuration with a larger opening than the upper section 25.

In the depicted embodiment, ten ribs 3 each with the same width and at the same distance from one another are arranged over the inner circumference of the lower section 26 of the connection pole 2. A different number of ribs is also advantageous. It makes sense for at least three ribs 3 to be provided. The greater the number of ribs, the narrower they need to be designed.

FIG. 3 shows the insertion of a pole shaft 5 into the connection pole 2, as was already described referencing FIG. 2. It is assumed as an example that the pole shaft 5 is guided to the connection pole 2 at somewhat of an angle. The pole shaft 5 has a leading rounded end 50 in insertion direction E. The pole shaft 5 first encounters the inner wall of the connection pole 2 or the ribs 3 arranged therein respectively by means of its rounded end 50. The pole shaft 3 is thereby aligned and centered upon further insertion into the connection pole 2 so that it ultimately inserts into the connection pole 2 in the desired substantially straight position. This is depicted in FIG. 4.

FIG. 4 shows part of an accumulator 10 having a housing section 4 and a cover section 1 of the type described above placed atop the housing section 4. Electrode plates forming an electrode plate group 7 are situated within the housing section 4. The electrode plate group 7 is electrically and mechanically connected to a pole shaft 5 by a connector 8. As can be seen, the pole shaft 5 is inserted into the connection pole 2 and protrudes somewhat from the connection pole 2 at the exterior of the accumulator. The pole shaft 5 is designed with a somewhat smaller diameter in this area than in its remaining areas. So doing forms an annular space 6 between the pole shaft 5 and the connection pole 2. This annular space 6 serves in the electrical and mechanical connection of the pole shaft 5 to the connection pole 2, e.g. by welding.

The invention claimed is:

1. A connection pole for an accumulator, wherein the connection pole comprises an inner hollow region configured to receive a pole shaft of the accumulator, wherein the connection pole comprises a plurality of ribs on its inner wall in the inner hollow region, wherein the plurality of ribs run in the longitudinal direction of the connection pole and are tapered at a first end region and a second end region, wherein one or more or all of the plurality of ribs are integrally formed with the connection pole from the material of said connection pole and protrude from the inner side of the connection pole such that the ribs form a gap between the pole shaft and the inner surface of the connection pole, and wherein the material of said connection pole is a conductive material.

2. The connection pole according to claim 1, wherein the connection pole comprises an attachment section adapted for the attachment of the connection pole in a housing section of the accumulator and one or more or all of the ribs are arranged on the inner wall of said attachment section.

3. The connection pole according to claim 2, wherein the attachment section comprises a labyrinth section in which the outer circumference of the connection pole exhibits at least one circumferential projection, wherein the labyrinth section is designed to form a labyrinth with the housing material of the accumulator and one or more or all of the ribs are arranged on the inner wall of the labyrinth section.

4. The connection pole according to claim 1, wherein the one or more or all of the ribs are arranged in a section of the inner wall at which the inner wall is tapered in the direction of insertion of the pole shaft.

5. The connection pole according to claim 1, wherein the one or more or all of the ribs are designed as friction-reducing sliding elements between the connection pole and the pole shaft.

6. The connection pole according to claim 1, wherein the one or more or all of the ribs have their largest dimension in the longitudinal direction of the connection pole.

7. The connection pole according to claim 1, wherein the one or more or all of the ribs are evenly distributed over the inner circumference of the connection pole.

8. The connection pole according to claim 1, wherein the ribs extend upward toward a connecting section of the connection pole designed for the connection of a pole terminal without reaching said connecting section.

9. The connection pole according to claim 1, wherein the one or more or all of the ribs are rounded on their side facing the interior of the accumulator.

10. The connection pole according to claim 1, wherein the conductive material is lead.

11. A system, comprising:
a connection pole for an accumulator, wherein the connection pole comprises an inner hollow region configured to receive a pole shaft of the accumulator, wherein the connection pole comprises a plurality of ribs on its inner wall in the inner hollow region, wherein the plurality of ribs run in the longitudinal direction of the connection pole and are tapered at a first end region and a second end region, wherein one or more or all of the plurality of ribs are integrally formed with the connection pole from the material of said connection pole and protrude from the inner side of the connection pole such that the ribs form a gap between the pole shaft and the inner surface of the connection pole, and wherein the material of said connection pole is a conductive material; and
the accumulator comprising at least one housing section, at least one electrode plate group inserted into the housing section, at least one pole shaft connected to the electrode plate group and a cover section in which at least one connection pole is integrated, wherein the pole shaft is led into or through an inner hollow region of the connection pole.

12. The system according to claim 11, wherein at no point does the pole shaft directly abut the inner side of the connection pole.

13. The accumulator according to claim 11, wherein the connection pole is embedded in a plastic material of the cover section, wherein the plastic material also at least partially covers the lower edge of the connection pole.

14. A system, comprising:
a connection pole for an accumulator, wherein the connection pole comprises an inner hollow region configured to receive a pole shaft of the accumulator, wherein the connection pole comprises a plurality of ribs on its inner wall in the inner hollow region, wherein the plurality of ribs run in the longitudinal direction of the connection pole and are tapered at a first end region and a second end region, wherein one or more or all of the plurality of ribs are integrally formed with the connection pole from the material of said connection pole and protrude from the inner side of the connection pole such that the ribs form a gap between the pole shaft and the inner surface of the connection pole, and wherein the material of said connection pole is a conductive material; and
wherein a leading end of the pole shaft when inserted or fed into the connection pole is of rounded configuration in the longitudinal direction of the pole shaft.

* * * * *

UNITED STATES PATENT AND TRADEMARK OFFICE
CERTIFICATE OF CORRECTION

| | |
|---|---|
| PATENT NO. | : 9,673,441 B2 |
| APPLICATION NO. | : 14/646849 |
| DATED | : June 6, 2017 |
| INVENTOR(S) | : Peter Streuer and Anne-Laure Ledoux |

It is certified that error appears in the above-identified patent and that said Letters Patent is hereby corrected as shown below:

1. In Column 7, Lines 32-33, delete "pole shaft 3" and insert -- pole shaft 5 --, therefor.

2. In Column 8, Line 64, in Claim 13, delete "The accumulator" and insert -- The system --, therefor.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*